Dec. 5, 1967   G. W. MORGAN   3,356,935
AUTOMOTIVE ELECTRICAL SYSTEM TESTER AND ANALYZER
Filed Feb. 18, 1964
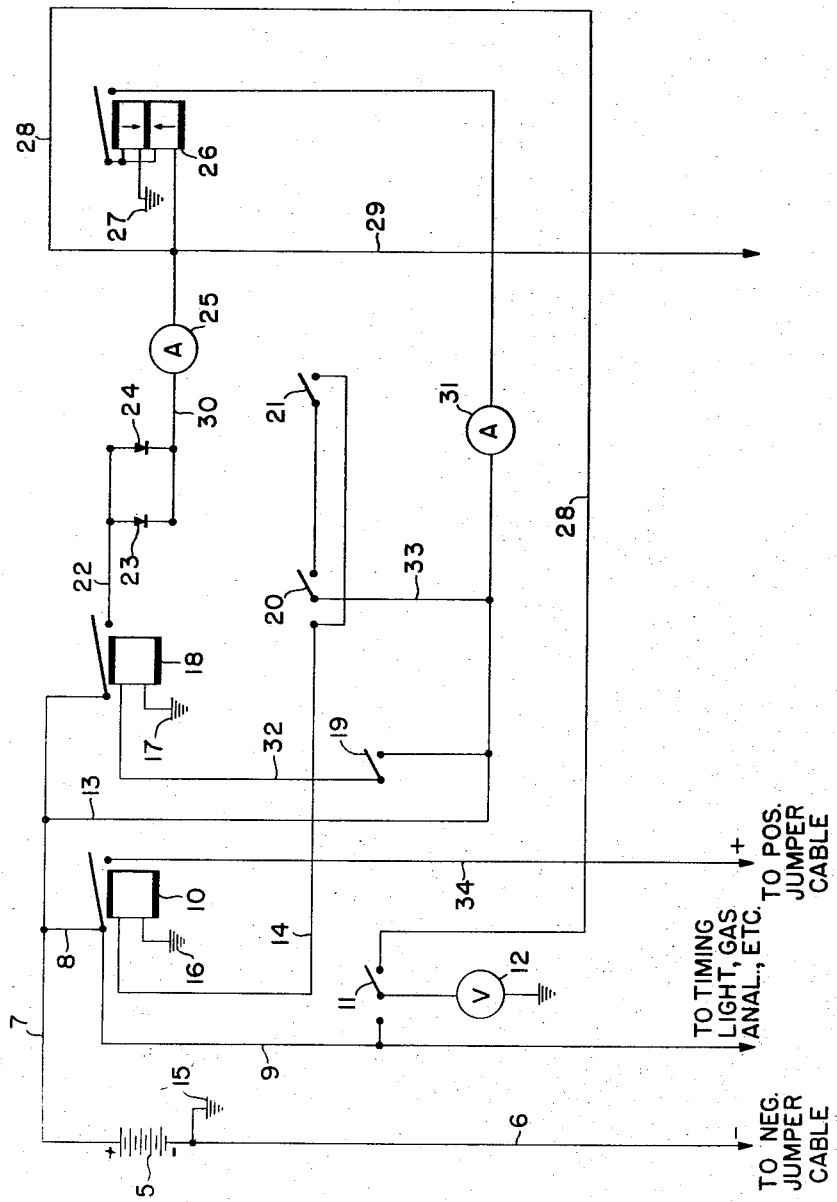
INVENTOR.
G. WAYNE MORGAN
BY Ernest Carl Edge United States Patent Office 3,356,935
Patented Dec. 5, 1967

3,356,935
AUTOMOTIVE ELECTRICAL SYSTEM TESTER
AND ANALYZER
George Wayne Morgan, 705 SE. 2nd Ave.,
Delray Beach, Fla. 33444
Filed Feb. 18, 1964, Ser. No. 345,663
8 Claims. (Cl. 324—16)

This invention relates in general to a tester and analyzer and in more particularly to a tester and analyzer for an automotive electrical system.

Although it is shown in the drawing and described throughout this specification as a tester and analyzer for an automobile engine it is not necessarily limited to such use but may be used in conjunction with other internal combustion engines such as, for example, airplane engines, boat engines, etc.

Most new automobiles today are equipped with an alternator instead of the common generator used in vehicles for many years. However, some of the new automobiles and most of the older automobiles have the generator system. It is just a matter of time before all vehicles will be equipped with alternators, but even after that time the two systems will coexist for many years until all vehicles with generators have disappeared.

At present there is no tester and analyzer for electrical systems which may easily be used with either a generator or an alternator system. Alternators can be tested with the volt-amp testers now known and widely used in the art but the procedure is quite complicated. Tricky connections and disconnections are necessary with the possibility that any error in connecting or disconnecting can cause serious damage.

It is a primary object of this invention, therefore, to provide an electrical system tester and analyzer which may be easily and safely used with either a generator system or an alternator system.

A further object of the invention is ot provide a test system which may be safely connected at all times. Due to the fact that an alternator system has no cutout it is "hot" at all times. Connections or clips which are not intended for the type of termnials involved can slip and cause a short circuit. My invention eliminates this hazard.

Reversed battery polarity will damage rectifiers and regulators of alternator systems. It is another object of my invention to provide a system by which it is practically impossible to reverse the battery polarity of the system.

Further, in an alternator system the vehicle battery must be fully charged or a fully charged battery must be used for test purposes. At present this is sometimes done by connecting a booster battery to the vehicle battery. Here again there is a possibility of damage to rectifiers and regulators due to a wrong connection of the battery. At other times a fast charger may be used to charge the vehicle battery but here again in some systems, unless the battery cables are disconnected before the fast charger is used, damage to the alternator will result, in the absence of a special alternator protector. In these same systems the fast charger should never be used to start a vehicle as damage to rectifiers will result. My tester and analyzer eliminates the need for a fast charger and the accompanying hazards by carrying its own fully charged battery at all times as part of the system.

A still further object of the invention is to provide an electrical system tester and analyzer which may be used to quickly test each of the individual electrical accessories such as the lights, clock, radio, etc., to determine if any one of them is not working properly. The testers and analyzers in use today can easily test the battery, the voltage regulator, and the generator when something goes wrong with the electrical system but any individual checking of the various electrical accessories must be done by trial and error. This is usually a time-consuming and many times utterly frustrating job for the serviceman. A tester and analyzer according to my invention can test each of the accessories with speed and ease to promptly locate any malfunction.

A further object of the invention is to provide an electrical system tester and analyzer which has a remote starter switch for conveniently turning the engine on and off without leaving the front of the automobile. With my invention it is not necessary to go into the body of the car, start the engine, then return to the work underneath the hood. All the serviceman has to do is energize the remote starter switch and he controls the turning on and off of the engine.

A still further object of the invention is to provide a safe means for using other test equipment, such as a gas analyzer or a timing light, which ordinarily use the automobile battery as a source of power. According to my invention a fully charged battery is always present on the tester itself to supply the power for such instruments in the event the automobile battery is weak or dead.

Still another object of the invention is to provide a convenient location of a fully charged power source for any use necessary in a garage or shop. Many times when a battery is needed for a small job of some sort the serviceman has to search all around the shop to find a battery, it must be tested to determine if it is charged, leads or jumper cables must be located, etc. These tasks become time-consuming and therefore expensive to the customer. My invention provide a fully charged power source with leads already connected ready for use, all stored in a convenient location at all times.

Further objects, advantages, uses, and adaptations of the invention will be apparent from the following description taken in conjunction with the accompanying drawing wherein:

The single figure is a schematic drawing of the circuit of my electrical system tester and analyzer.

Referring now to the drawing, 5 indicates a source of power which is carried by the tester at all times. It may take the form of a regulator 6, 12, or 24 volt battery known in the art today. It is important that a full charge be kept on power source 5 at all times therefore this may be accomplished by conecting it to a charger between uses of the tester. Power source 5 is grounded at 15.

Connected to the negative terminal of power source 5 is line 6 which leads to a negative jumper cable. In order to prevent a wrong connection of this negative jumper cable it may be provided with a negative terminal constructed the same as that used on a regular automobile battery instead of the usual jumper cable clip. Due to the fact it is standard practice to make the negative terminal of the battery smaller than the positive terminal a person connecting this line 6 to the automobile can only connect it to the negative eyelet terminal of the automobile battery cable without difficulty. If the serviceman attempts to connect it to the positive eyelet terminal, the fact that the two terminals are of different sizes will indicate to him he is making a wrong connection. This is a safety measure against reversed connections.

However, if it is felt that the usual jumper cable clip must be used then a connection with a spring type negative battery cable clip, commonly known and used today, may be used.

The positive side of power source 5 is connected by line 7 to relay 10, shown with the energizing coil grounded at 16. When relay 10 is energized then line 34 leading to the positive jumper cable is cut into the circuit.

Line 29 is used for test purposes and is provided with a suitable clip for attaching to the various parts of the automobile electrical system.

The remaining portions of the circuit can best be described by relating what each element does and how it cooperates with each of the other elements during actual operation of the tester.

Operation of the tester for overall testing of the entire electrical system of the automobile for locating such troubles as high resistance connections, bad ground cable connections, shorted wiring, shorted switches, general indication of malfunctioning of the equipment, intermittent shorts, open circuits, etc., is as follows:

The negative battery cable of the automobile is disconnected from the automobile battery and connected to the terminal on the end of line 6. As suggested previously, if a connection constructed the same as the negative battery terminal is used as the connector on the end of line 6 it is impractical to connect the wrong terminals and reverse the polarity of the system.

Line 29 is then connected to the particular part or unit of the electrical circuit which is being tested. Switch 19 is closed to energize relay 18 and switch 11 is thrown to the right in FIGURE 1 and placed into the generator position. Voltmeter 12 will then indicate the amount of voltage applied to whichever unit of the electrical system or electrical accessory to which line 29 is connected. Ammeter 25 will show the current draw of the unit being tested.

It is to be noted here that with a 12 volt power source 5 fully charged it is supplying a voltage of approximately 12.6 volts but due to the voltage drop across rectifier diodes 23 and 24, connected in parallel, a voltage of 12 volts will be applied to line 29 and will be so indicated on voltmeter 12 through the line 28. As long as the circuit is only getting 12 volts then reverse current relay 26 remains open.

An example of a test is to determine if the tail lights of the automobile are working properly. Line 29 is connected to the lead to the tail lights. If there is some malfunction in the tail light circuit then ammeter 25 will show an excessive current draw or possibly no current draw and we have isolated our trouble. If there is no trouble in the tail lights then a normal draw for the number of bulbs in use would show on ammeter 25 and we would proceed to our next test.

Line 29 may be moved to any element of the electrical system and each may be tested in the same manner without moving the tester from its position near the serviceman where it may easily be read.

Operation of the tester in making normal tests such as generator output and voltage regulator operation is as follows:

The negative battery cable of the automobile is disconnected from the automobile battery and connected to the terminal on the end of line 6.

Line 34 is then connected to the positive terminal of the automobile battery. This takes the automobile battery as a source of power out of the circuit of the electrical system of the automobile and substitutes therefor the power source 5.

In making tests on the generator and voltage regulator the engine of the automobile must be running. Line 34 may either be connected to the positive terminal of the vehicle battery or to the starter side of the vehicle starter solenoid. In some makes of cars it is very inconvenient to connect it to the starter solenoid therefore it can be connected to the positive terminal of the battery.

Line 29 is then connected to the positive terminal of the vehicle battery. Switch 19 is then closed which energizes relay 18 and this in turn energizes the automobile electrical system by means of power source 5.

To use the remote starter switch 21 to start the car then switch 20 is closed to the right hand "on" position. If the remote starter switch 21 is not going to be used, but instead the vehicle ignition or a remote switch independent of the tester is going to be used then switch 20 is placed in the "on" position to the left.

Assuming we are using remote switch 21 now, when it is closed it energizes relay 10 thereby energizing the automobile starter due to the fact that line 34 is connected to the starter side of the starter solenoid, or to the positive terminal of the vehicle battery. After the car is started then switch 20 is returned to the "off," or center, position.

Lead 34 at this point may or may not be disconnected; as far as the tests are concerned it makes no difference.

With the automobile engine running, ammeter 25 will indicate the amount of current drawn by any and all electrical accessories in operation on the vehicle at this time including the ignition system draw and the generator field current draw.

If the generator is putting out more voltage than available from power source 5 (which it should do and would indicate nothing is wrong with the generator) relay 26 is energized and we have a direct non-resistive return line to power source 5 through ammeter 31. Ammeter 31 will show the rate of charge into power source 5.

If switch 11 is placed in the right "on" position to indicate the voltage on line 29 then voltmeter 12 will show whether the generator is supplying the proper output voltage.

With some or all of the electrical accessories operated at this point it is possible to determine if the generator is supplying enough current or power to operate the accessories or if power source 5 is being dissipated by an amount equal to the difference between the demand and the generator output.

If this condition exists then it indicates low output from the generator, a slipping fan belt, more accessories than that at which the vehicle system is rated, or some such malfunction. Each of these possibilities is easily checked and the trouble is located.

To my knowledge no other tester now being made will indicate under actual operating conditions whether you are putting in or taking from the power source without a series of changes of connections whereas my tester will so indicate with no change in connections whatsoever.

Automobiles are being made today with almost all terminals and connections of the wiring system covered for protection. It is practically impossible to find a place which is convenient and safe to connect test instruments, other than electrical system test instruments, which require battery voltage. To remedy this situation I provide means by line 9 connected to power source 5 to supply battery voltage for various tests. Examples of testing devices used which may take their power from line 9 are timing lights, exhaust gas analyzers, coil testers, etc.

When utilizing my tester in this manner only the battery as a power supply is being used with the balance of the test system inoperative.

Attention is called to the fact that in making tests once the negative terminal of the battery is disconnected the danger of a short circuit from any test leads or connections of any test instruments is eliminated due to the fact that there is no electrical current supplied through the vehicle battery or the test battery until the tester is turned on. This is an important safety factor since under the testers in use today there is a constant connecting and disconnecting of hot leads with the possibility that each time this is done there may be arcing and danger of shorting out.

Fire hazard from electrical shorts is also greatly reduced and practically eliminated by my tester. If a man comes into a shop with a fire in one of his electrical accessories and the vehicle battery is disconnected to eliminate the fire, as soon as the vehicle battery is connected again the same fire conditions exist. With my tester the vehicle battery is never reconnected, therefore this hazard is eliminated due to the fact that the power supply to the accessories is controlled through switches and relays and can be turned on and off immediately.

Another safety feature is the fact that the control of the vehicle ignition system in case of an emergency is at the serviceman's finger tips without him having to go around to the body of the vehicle and kill the ignition. In most instances of this sort, time is of the essence and if the serviceman does not have to move from beneath the hood then a great saving in time is accomplished.

Having described only one embodiment of my invention, I do not wish to be limited or restricted to specific details herein set forth but wish to reserve to myself any variations or modifications that may appear to those skilled in the art and falling within the scope of the following claims.

What is claimed is:

1. An electrical system tester and analyzer for an internal combustion engine electrical system comprising:
    (a) an electrical power source of the same type normaly employed in the system,
    (b) a first conductor having one end connected to the negative terminal of said power source and another end for connection to the normally negative terminal of the electrical system of an internal combustion engine,
    (c) a second conductor having one end connected to the positive terminal of said power source and another end for connection to the normally positive terminal of the electrical system of an internal combustion engine,
    (d) a first relay having its switching contacts connected in series with said second conductor,
    (e) a test lead conductor having one end connected to the positive terminal of said power source and another end for connection to selected points of the electrical system,
    (f) test instruments electrically connected in said test lead conductor,
    (g) a second relay having its switching contacts connected in series with said rest lead conductor,
    (h) means including said power source for energizing said relays during a testing operation to thereby close their respective switching contacts,
    (i) said test instruments including an amperage measuring device and a voltage measuring device,
    (j) a reverse current relay connected to said test lead conductor to sense the current flow therethrough,
    (k) a by-pass conductor electrically connected in parallel with said voltage measuring device,
    (l) said by-pass conductor electrically connected in series with the switching contacts of said reverse current relay.

2. An electrical system tester and analyzer as recited in claim 1 with
    (m) an amperage measuring device electrically connected in said by-pass conductor.

3. An electrical system tester and analyzer according to claim 2 with
    (n) said means for energizing said relays including a single pole double throw switch.

4. An electrical system tester and analyzer according to claim 3 with
    (o) a remote control switch electrically connected to said single pole double throw switch.

5. An electrical system tester and analyzer according to claim 4 with
    (p) an auxiliary power-supplying line connected to the positive terminal of said power source for supplying power to measuring instruments to be used in testing various functions of components of an internal combustion engine.

6. An electrical system tester and analyzer according to claim 5 with
    (q) a voltage reducer in said test lead conductor between said power source and said test instruments.

7. An electrical system tester and analyzer according to claim 6 in which
    (r) said voltage reducer is comprised of a plurality of diodes.

8. An electrical system tester and analyzer according to claim 7 in which
    (s) said plurality of diodes are connected in parallel.

References Cited

UNITED STATES PATENTS

| | | | |
|---|---|---|---|
| 2,520,071 | 8/1950 | Tennefos | 324—15 X |
| 2,696,605 | 12/1954 | Knickerbocker | 324—73 X |
| 2,700,301 | 1/1955 | Thomsen | 324—15 X |
| 2,826,737 | 3/1958 | Crumbliss | 324—73 X |
| 2,845,614 | 7/1958 | Bell | 324—51 X |
| 2,881,361 | 4/1959 | Wood | 324—51 X |
| 3,142,797 | 7/1964 | Grant | 324—73 |
| 3,158,804 | 11/1964 | Weissert | 324—15 |

RUDOLPH V. ROLINEC, *Primary Examiner.*

A. E. RICHMOND, M. J. LYNCH, *Assistant Examiners.*